May 8, 1962 J. D. MALLOY 3,033,329
BRAKE COOLING FLUID PUMP
Filed April 6, 1960 3 Sheets-Sheet 1

INVENTOR.
John D. Malloy
BY
HIS ATTORNEY

INVENTOR.
John D. Malloy
BY
HIS ATTORNEY

May 8, 1962 J. D. MALLOY 3,033,329
BRAKE COOLING FLUID PUMP
Filed April 6, 1960 3 Sheets-Sheet 3
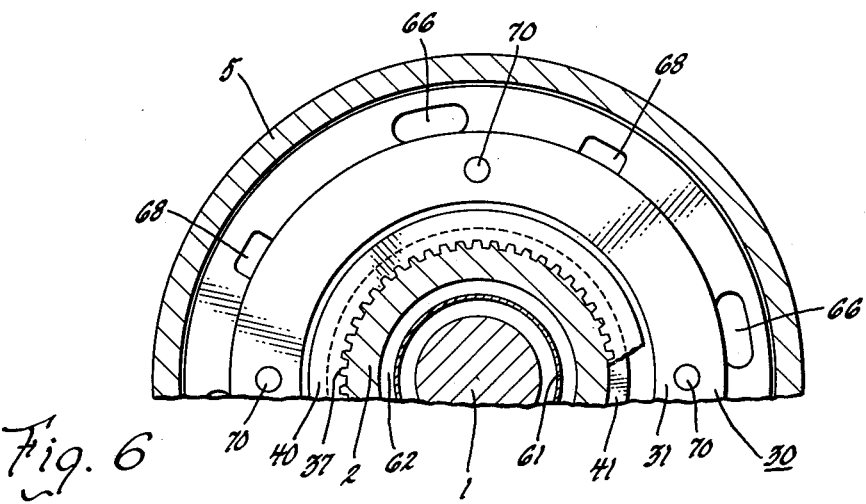
Fig. 6
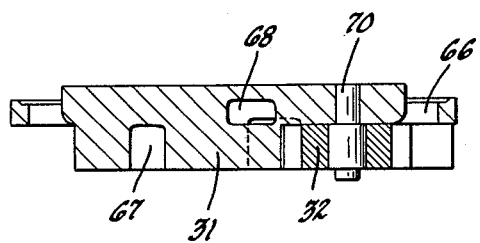
Fig. 4
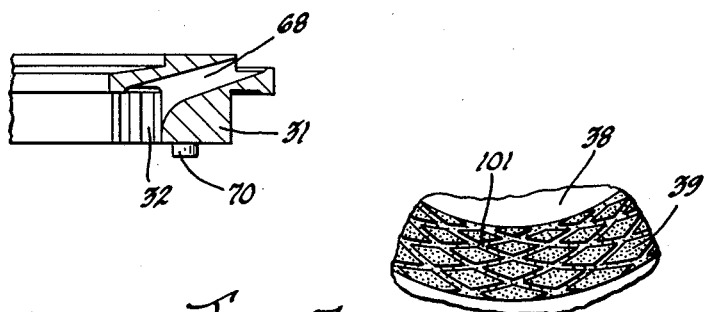
Fig. 5
Fig. 7
INVENTOR.
John D. Malloy
BY
HIS ATTORNEY

United States Patent Office 3,033,329
Patented May 8, 1962

3,033,329
BRAKE COOLING FLUID PUMP
John D. Malloy, Royal Oak, Mich., assignor to General Motors Corporation, Detroit, Mich., a corporation of Delaware
Filed Apr. 6, 1960, Ser. No. 20,298
12 Claims. (Cl. 188—264)

This invention relates to a vehicle brake and more particularly to a cooling fluid pump for operation within a brake cooling fluid system.

The capacity of a vehicle brake may be increased providing a cooling fluid system for the braking means. This is particularly true in a vehicle disc brake which is inherently a compact braking means which dissipates considerable heat within a small area. A cooling fluid pump is often employed in the cooling system to provide additional capacity in transferring the dissipated heat within the braking structure to some external cooling point. The operation of the cooling fluid pump, however, does create a horse power loss. This loss may be eliminated to a certain degree if the pump is operated only when needed. The controlled operation also adds to the life of the cooling fluid pump.

Accordingly, this invention is intended to provide a planetary gear pump which rotates as a unit with the vehicle wheel when the brakes are not actuated and provides pumping of cooling fluid upon engagement of the pump with stator means.

It is an object of this invention to provide a cooling fluid pump which rotates with the vehicle wheel when the vehicle brakes are not actuated and which provides pumping of the vehicle fluid when the vehicle brakes are actuated.

It is a further object of this invention to provide a cooling fluid pump which rotates with the vehicle wheel and is positioned between stator elements to provide operation and pumping of cooling fluid when the stator elements engage the pump.

The objects of this invention are accomplished by means of employing a vehicle disc brake which is fluid actuated. A cooling fluid system is also employed to circulate a cooling fluid between the plurality of vehicle discs which have passage means to accommodate the flow of fluid between the discs during brake actuation. A planetary gear pump is used which has a ring gear for rotating the pump assembly with the vehicle wheel. Internally of the planetary gears, a sun gear is also employed which rotates freely about the shaft housing. The pump assembly is positioned between one of the stator discs on the end of the disc stack and a stator element which tends to prevent rotation of the pump housing as the vehicle brakes are actuated. In this manner, the ring gear causes rotation of the planetary gears and the sun gear thereby causing a pumping action as the vehicle brakes are actuated. The gear pump operates when the vehicle brakes are actuated and the operation of the fluid cooling pump is in directed proportion to the degree of actuation of the vehicle disc brake.

Further objects and advantages of the present invention will be apparent from the following description, reference being had to the accompanying drawing wherein preferred embodiments of the invention are clearly shown.

In the drawings:

FIGURE 4 is a cross-sectioned view taken on line 4—4 of FIGURE 3.

FIGURE 5 is a cross-sectioned view taken on line 5—5 of FIGURE 3.

FIGURE 6 is a cross-sectioned view taken on line 6—6 of FIGURE 1 and shows the end view on the exhaust side of the cooling fluid pump.

FIGURE 7 is a fragmentary section taken on line 7—7 of FIGURE 1.

Figure 1:
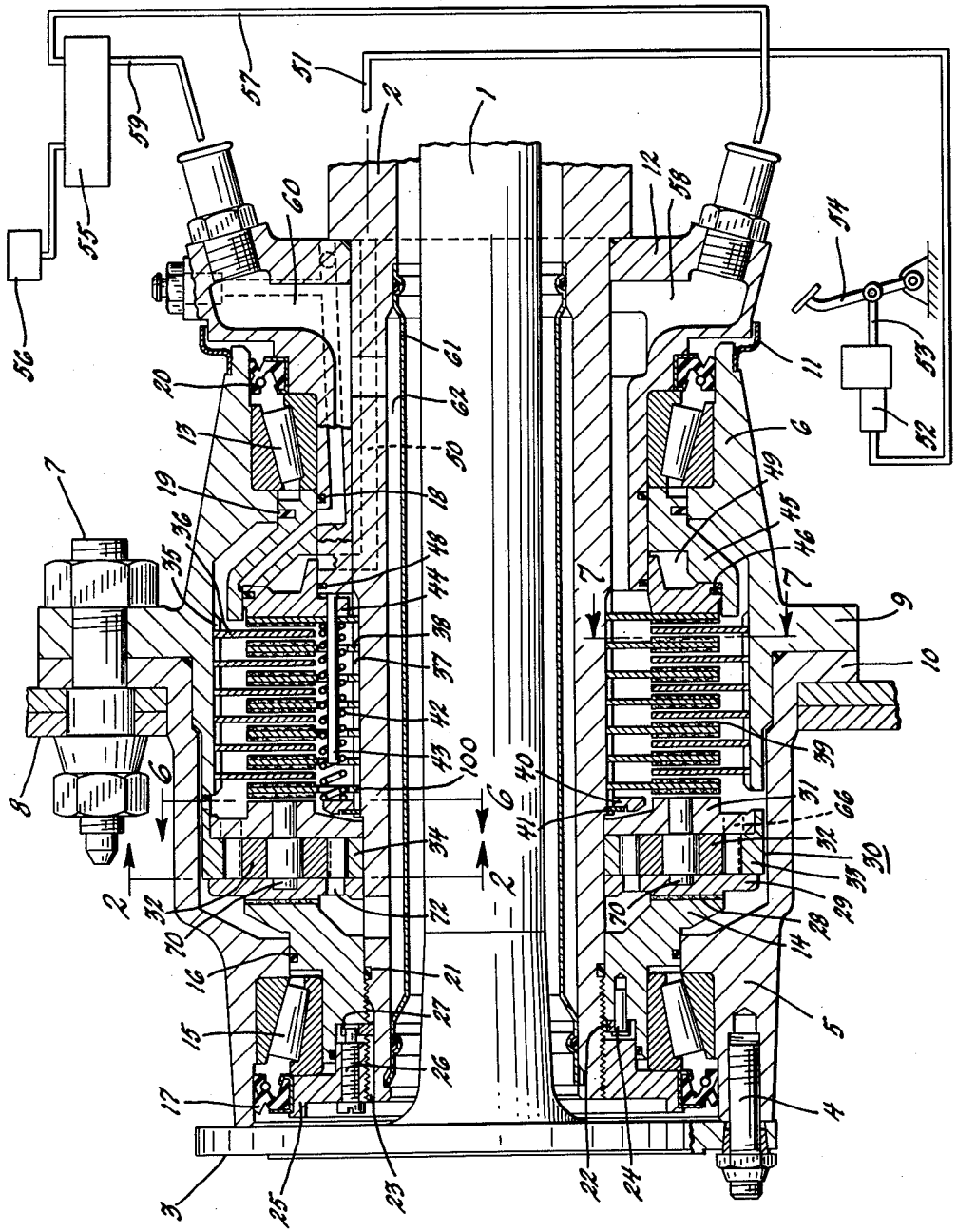
FIGURE 1 is a cross-sectioned view of the vehicle disc brake showing the position of the cooling fluid pump.

Referring to FIGURE 1, this view illustrates the vehicle brake and its relative rotation with the cooling fluid pump. The drive-shaft 1 extends through the shaft housing 2. The drive shaft 1 is provided with a radial flange 3 for receiving a plurality of bolts 4 which threadedly engage the outboard end of the outer brake housing 5. The outer housing 5 receives the inner brake housing 6 on its inboard end. A plurality of wheel bolts 7 fasten the wheel 8 to the radial flanges 9 and 10 of the inner brake housing 6 and the outer brake housing 5 respectively.

The inboard end of the inner brake housing 6 is provided with a dirt shield 11. The shield 11 extends inboard over a portion of the oil delivery sleeve 12. The oil delivery sleeve 12 is mounted on the outer periphery of the shaft housing 2.

The oil delivery sleeve 12 extends outboard about the outer periphery of the shaft housing 2 to provide a bearing support for the inboard bearing assembly 13. The inboard bearing assembly 13 provides a rotatable support for the inner brake housing 6.

The outboard end of the shaft housing 2 receives the pressure plate 14 which provides a support for the outboard bearing assembly 15. The outboard bearing assembly 15 provides a rotatable support for the outer brake housing 5.

The outer bearing assembly 15 is provided with a seal 16 on its inboard side and the seal assembly 17 on its outboard side.

The inboard bearing assembly 13 is provided with seals 18 and 19 on its outboard end and a seal assembly 20 on its inboard end.

The pressure plate 14 is threaded on its inner periphery to engage a mating threaded portion on the outer periphery of the shaft housing 2. A seal 21 is placed in an annular groove on the shaft housing adjacent the pressure plate to seal the cooling fluid at this point in the cooling fluid system.

A locking plate 22 is mounted outboard of the pressure plate 14. The locking plate 22 is provided with a plurality of teeth on its inner periphery which fit into axially extending grooves 23 on the outer periphery of the outboard end of the shaft housing 2. The locking plate 22 slides axially on the outboard end of the shaft housing 2 and engages the outboard end of the pressure plate 14. The pressure plate 14 may be rotated and advanced axially on the threads of the shaft housing and then locked in position by means of the lock pin 24. In this manner, the pressure plate 14 is adjusted to provide a clearance between the braking discs. The pressure plate 14 is then locked in position.

The annular nut 25 then is threadedly advanced on the outboard end of the shaft housing 2. The annular nut 25 is advanced to provide the proper bearing adjustment on the bearing assemblies 13 and 15. When the proper bearing adjustment is made, the lock screw 26 is then screwed into the annular nut 25 so that it locks in one of the plurality of slots 27 in the lock plate 22. In this manner, the bearings are adjusted by the annular plate 25 to the desired tightness.

The pressure plate 14 is provided with a friction material 28 for engaging the cover plate 29 of the cooling fluid pump 30. The cooling fluid pump 30 includes the pump casing 31 for receiving the plurality of planetary gears 32. The planetary gears 32 are received within the casing 31 and the ring gear 33 fits about the outer periphery of the casing 31. The sun gear 34 is received within the inner periphery of the planetary gears 32. The end plate 29 encloses the outboard side of the ring gear, the sun gear and the planetary gears. The sun gear 34 rotates about the outer periphery of the shaft housing 2 when the vehicle wheel 8 rotates. The ring gear 33 has an axial spline for engaging the outboard end of the inner brake housing 6 to provide the means for rotating the pump assembly.

In this manner, the ring gear 33 rotates with the wheel at all times when the wheel 8 is rotating. The casing 31 however rotates with the pump assembly but rotates at a slower speed than the ring gear 31 when it frictionally engages the outboard stator disc 100 of the brake assembly. The plate 29 also engages the friction material 28 of the pressure plate 14 and in this manner the cover plate 29 and the casing 31 rotate about the shaft housing 2 at a slower rate than the ring gear 31 thereby causing pumping action of the fluid cooling pump 30.

The brake assembly includes the brake housings 5 and 6. The inner brake housing 6 is provided with a splined portion 35 for receiving the plurality of rotating discs 36. The stator member 2 is provided with a splined portion 37 for receiving the plurality of stationary discs 38. The stationary discs 38 and the rotating discs 36 are concentrically mounted relative to each other in a position for frictional engagement.

The stator discs 38 are provided with a frictional material 39 on both sides of the discs for engagement with the rotating discs 36. The frictional material 39 is provided with radial passages 101 to accommodate the flow of cooling fluid between the discs when the discs are in frictional engagement.

The outboard end of the splined portion 37 of stator 2 receives an annulus 40 which is held in position by a snap ring 41. The annulus 40 provides a means for mounting of the plurality of retraction springs 42. The retraction springs 42 are mounted on a plurality of rods 43 which extend through the annular hydraulic wheel piston 44 and abut the axially outboard end of the oil delivery plate 12.

As the vehicle brakes are retracted, the springs 42 engaging the inboard side of the annulus 40 bias the wheel piston 44 to a retracted position.

The annular hydraulic piston 44 is mounted concentrically within the annular hydraulic wheel cylinder 45. The annular hydraulic wheel cylinder 45 is provided with a sealing means 46 between a hydraulic wheel piston 44. The radially inner portion of a hydraulic wheel cylinder 45 is mounted on the outer periphery of the oil delivery sleeve 12. The oil delivery sleeve 12 receives a seal 18 between the hydraulic wheel cylinder 45 and also seal 48 between the annular hydraulic wheel piston 44. This provides a pressurizing chamber 49 for actuating of the hydraulic wheel piston 44 in engaging the vehicle discs of the disc brake.

The vehicle disc brakes are actuated through a hydraulic brake actuating system.

The actuating fluid chamber of the hydraulic wheel cylinder 45 is connected by a passage means 50 to the conduit 51. The conduit 51 is connected to the master cylinder 52. Fluid is pressurized within the hydraulic master cylinder 52 by means of the pedal 54 operating through the push rod 53.

The cooling fluid system includes a reservoir 55 connected to an expansion chamber 56. The reservoir 55 is connected to the conduit 57 which is in communication with the passage means 58 which lead to the inner periphery of the vehicle disc brake. The conduit 59 from the reservoir 55 leads into the passage means 60. The passage means 60 leads to the outer periphery of the sleeve 61 which is sealed on the inboard and outboard end to provide a passage means 62 to the outboard side of the cooling fluid pump 30.

The cooling fluid pump 30 pumps fluid to the outer periphery of the vehicle disc brake. The fluid is then forced through a plurality of passages 101 in the friction material of the vehicle disc brake. The fluid then circulates to the inner periphery of the vehicle disc brake and then returns to the reservoir 55.

Figure 2:
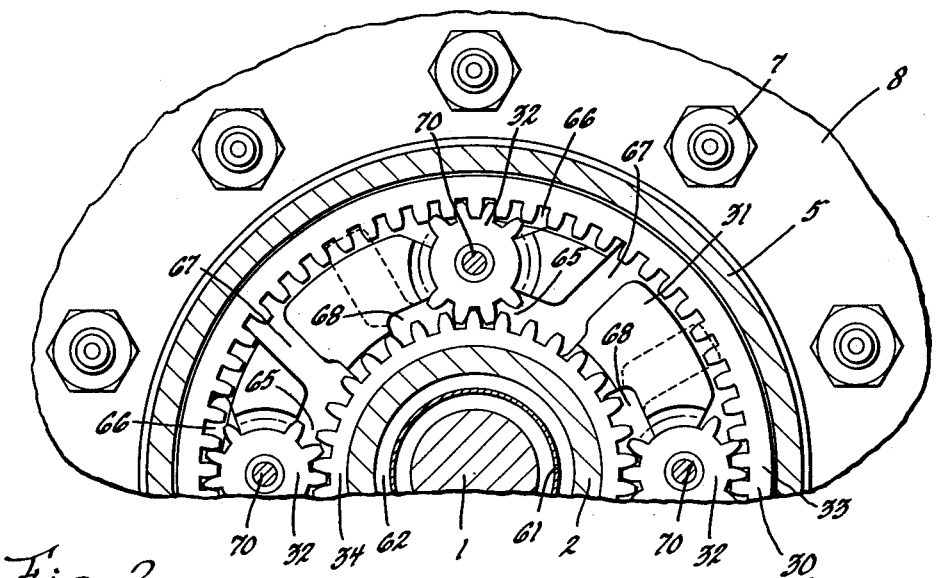
FIGURE 2 is a cross-section view taken on line 2—2 of FIGURE 1 showing the cooling fluid pump.

FIGURE 2 is a cross-sectioned view showing the more detailed structure of the cooling fluid pump. The view is taken on line 2—2 of FIGURE 1 which shows the cover plate 29 broken away from the cooling fluid pump assembly. The outer brake housing 5 is shown in cross section. The outboard end of the ring gear 33 is shown with a slight clearance as it is mounted concentrically within the outer brake housing 5. The ring gear 33 meshes with the plurality of planetary gears 32. The sun gear 34 meshes with the planetary gears 32 also. The inner periphery of the sun gear 34 mounts as a bearing on the outer periphery of the shaft housing 2. The view also shows the passage 62 of the cooling fluid piston. The passage 62 is formed by the inner periphery of the shaft housing 2 and the sleeve 61.

As the wheel rotates, the ring gear 33, the planetary gears 32 and the sun gear 34 all rotate as a unit when the brakes are retracted. This being true because the inner periphery of the sun gear rotates as a bearing on its inner periphery on the outer periphery of the shaft housing 2.

Figure 3:
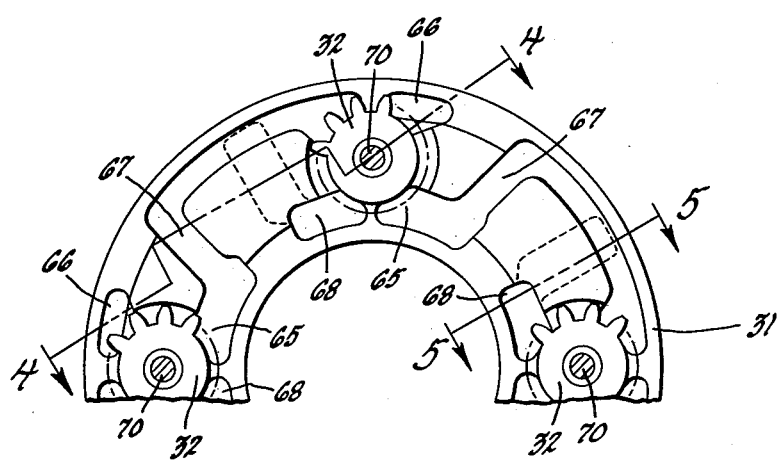
FIGURE 3 is a view of the pump housing and the planetary gears as well as the passages within the cooling fluid pump.

FIGURE 3 illustrates the passage means within the pump casing 31. The fluid enters the outboard side of the pump casing 31 at the chamber 65. The fluid entering through the chamber 65 rotates with a planetary gear to the passage 66 where it exhausts on the opposite side of the pump 30. The fluid entering the chamber 65 also flows through the passage 67 to the outer portion of the planetary gear. The fluid then passes with the planetary gear to the passage 68 and exhausts through the passage 68 on the inboard side of the pump assembly 30. It is readily seen that the fluid entering the chamber 65 follows the planetary gear for slightly less than 180° and then is exhaust through the passage 66. The fluid splits at this point and also passes in the opposite direction to utilize both sides of the planetary gears 32 in pumping.

The outlet ports of the passages 66 and 68 are shown in FIGURE 6. These ports feed to the outer periphery of the vehicle disc brake. FIGURE 6 being taken in line 6—6 of FIGURE 1 illustrates the inboard side of the pump casing 31. FIGURE 6 also shows the annulus 40 mounted on the splined portion 37 of the shaft housing 2. The planetary gears 32 are mounted on a plurality of pins 70 which extend through the planetary gears and seat in openings in the cover plate 29 and the casing 31. In this manner, the pump casing 31 is maintained in non-rotative position in regard to the cover plate 29. This provides a constant relationship between the cover plate and the casing as well as each of the planetary gears. The ring gear and the sun gear rotate relative to these three parts of the pump assembly 30.

FIGURE 4 is taken on line 4—4 of FIGURE 3 and illustrates the shape of the passage 68 and passage 66. The pin 70 is also shown in its mounted position within the casing 31.

FIGURE 5 is a cross section view taken on line 5—5 showing the formation within the passage 68. The passages shown in these cross sections illustrate the movement of the fluid as it enters the cover plate 29 and is circulated by means of the plurality of planetary gears 32 until it exhausts on the inboard side of the cooling fluid pump. This provides a forced circulation of the cooling fluid at all times when the vehicle brakes are actuated.

Prior to brake actuation, the pump assembly 30 is rotating as a unit with the vehicle wheel 8. The ring gear 33 is splined connected to the inner brake housing 6 to provide a means for rotation of the pump assembly 30. The sun gear 34 also rotates as a bearing in the outer periphery of the shaft housing 2 when the brakes are not being actuated. The cooling fluid pump 30 is not pumping fluid when the brakes are not actuated.

The cooling fluid pump operates in the following described manner.

As fluid is pressurized within the master cylinder 52 by the movement of the brake pedal 54, the fluid is also pressurized within the actuating chamber 49 of the annular hydraulic wheel cylinder 45. The pressurization with the chamber 49 moves the hydraulic wheel piston 44 axially to compress the disc stack and frictionally engage the rotating discs with the stationary discs. This in turn creates a pressure between the outboard stator disc and the inboard side of the pump casing 31. The outboard side of the cover plate 29 of the pump assembly 30 also engages the inboard side of the pressure plate 14.

During brake actuation as the pump casing 31 engages the outboard stator disc 100 and the cover plate 29 engages the pressure plate 14 it causes the cover plate and the pump casing to rotate at a slower rate about the axial center of the vehicle wheel and the ring gear 33 which rotates with the wheel. The greater the pressure in brake actuation the greater the deceleration of the cover plate and the casing. The retardation of the cover plate and the pump casing cause the meshing of the planetary gears 32 with the inner periphery of the ring gear 33 and the outer periphery of the sun gear 34. As the planetary gears rotate, the fluid on the inlet port 72 enters the opening between the plurality of teeth of the planetary gears 32. The unmeshing of the planetary gears with the sun gear provides an opening or a suction on the inlet side of the cooling fluid pump 30. As the planetary gear rotates, it then meshes with the ring gear to force the fluid contained between the planetary gear teeth to exhaust through the passage 66 leading to the inboard side of the fluid cooling pump.

A portion of the fluid entering the inlet passage 72 is diverted and feeds through the passage 67 and flows into the opening between the planetary gear teeth as they unmesh with the ring gear 33. This causes an additional suction on the input side of the cooling fluid pump. The fluid then rotates between the gear teeth of the planetary gears 32 until it reaches the passage 68 where it is forced outwardly through the passage 68 as the planetary gear again meshes with the sun gear 34. This causes a forced flow of cooling fluid through the passages 68. In this manner, the cooling fluid is forced to flow through the planetary gear pump causing a pressure on the outer periphery of the vehicle disc brake. At this time, the vehicle disc brakes are frictionally engaging each other but a plurality of radial passages are provided within the frictional material to accommodate the radial inward flow of the cooling fluid through the braking structure. The cooling fluid passes to the radially inner portion of the vehicle disc brake and flows through the passage 58 to the conduit 57 and inlet side to the reservoir 55. The suction of the cooling fluid pump 30 creates a flow through the conduit 59 and passages 60 and 62 to the inlet side of the cooling fluid pump. The cooling fluid is circulated through the brake fluid system when the vehicle brakes are actuated. The cooling fluid is circulated in direct proportion to the degree of actuation of the vehicle brakes.

As the vehicle brakes are released, the pump assembly is again permitted to rotate as a unit with the vehicle wheel.

The retraction springs 42 bias the hydraulic wheel piston axially inboard thereby providing a clearance between the rotating and stationary discs of the vehicle disc brake. The pump assembly 30 is also free to move axially to provide a clearance between the cover plate 29 and the pressure plate 14. This provides the advantage that there is little turbulence of the cooling fluid caused by the pumping of the cooling pump as well as a reduced wear of the cooling fluid pump as the pump operates when the brakes are actuated.

While the embodiments of the present invention as herein disclosed, constitute preferred form, it is to be understood that other forms might be adopted.

What is claimed is as follows:

1. In a vehicle disc brake having cooling fluid means comprising in combination, a rotatable member, at least one rotating disc connected to said rotatable member, a stationary member, at least one stationary disc connected to said stationary member for frictionally engaging with said rotatable disc, means mounted concentric with said discs for frictionally engaging said rotating and said stationary discs to actuate said vehicle brakes, a reaction means mounted concentric with said discs for providing a reaction force when said brakes are actuated, a fluid cooling system having a cooling fluid pump including, a ring gear for rotating with said rotating member, a sun gear rotatably mounted on said stationary member, a plurality of planetary gears for meshing with said ring gear and said sun gear, a housing means supporting and enclosing said plurality of planetary gears, said housing means positioned between and frictionally engaging said reaction means and one of said stationary discs to thereby cause operation of said fluid cooling pump and create circulation through said fluid cooling system when said vehicle brakes are actuated.

2. In a vehicle disc brake having a fluid cooling means comprising in combination, a rotating member, at least one rotating disc connected to said rotating member, a stationary member, at least one stationary disc connected to said stationary member for frictionally engaging said rotating disc, means mounted concentrically with said discs for frictionally engaging said rotating and said stationary discs, to actuate said vehicle brake, a reaction means mounted concentrically with said discs to provide a reaction force when said brakes are actuated, a fluid cooling system including a fluid cooling pump, mounted between one of said stationary discs and said reaction means comprising, a ring gear connected to said rotating member, a sun gear rotatably mounted on said stationary member, a plurality of planetary gears for meshing with said sun gear and said ring gear, a pump housing means positioned concentric with said rotating discs and stationary discs engaging said one stationary disc and said reaction means to rotate said pump housing at a slower rate than said ring gear thereby causing meshing of said planetary gears with said sun gear and said ring gear and cause circulation of the cooling fluid through said cooling fluid system.

3. In the vehicle disc brake having fluid cooling means comprising in combination, a rotatable member, at least one rotating disc connected to said rotatable member, a stationary member, at least one stationary disc connected to said stationary member for frictionally engaging said rotating disc, means mounted concentric with said discs for frictionally engaging said rotating and said stationary discs to actuate said vehicle brakes, a reaction plate mounted concentrically with said rotating and said stationary disc for providing a reaction force when said brakes are actuated, a cooling fluid pump assembly mounted concentric with said rotating and said stationary discs between said disc stack and said reaction plate, said cooling fluid pump including a cover plate for frictionally engaging said reaction plate, a pump casing engaging the adjacent stationary disc, a ring gear for rotation with said rotatable member, a sun gear rotatably mounted on said stator member, a plurality of planetary gears for meshing with said sun gear and said ring gear and rotatably mounted in said pump casing, said cover plate and said pump casing engaging said reaction plate and one of said stationary discs when said stationary disc frictionally engages said rotating disc and thereby provide circulation of cooling fluid through said vehicle discs of said vehicle disc brake.

4. In a vehicle brake having fluid cooling means, comprising in combination, a rotatable member, at least one rotating disc connected to said rotatable member, a stationary member, at least one stationary disc connected to said stationary member for frictionally engaging with said rotating disc, a reaction plate mounted on said stator member concentrically with said stator disc, a cooling fluid system including a cooling fluid pump comprising a ring gear connected to said rotatable member, a sun gear rotatably mounted on said stator member, a cover plate concentrically mounted with said reaction plate for frictionally engaging said reaction plate upon brake actuation, a plurality of planetary gears for engaging with said ring gear and said sun gear, a pump casing and said coverplate enclosing and rotatably supporting said plurality of planetary gears and concentrically mounted with said stator disc for frictionally engaging said stator disc upon actuation of said vehicle brakes, said stator disc engaging said pump casing and said pressure plate engaging said cover plate to retard the rotation of said pump casing relative to said ring gear thereby providing pumping of cooling fluid through said rotatable and said stationary brake discs when said vehicle brakes are actuated.

5. In the vehicle brake, comprising in combination, a rotatable member, at least one rotating disc connected to said rotatable member, a stationary member, at least one stationary disc connected to said stationary member for frictionally engaging said rotating disc, hydraulic means for actuating said vehicle disc brake including a hydraulic annular wheel cylinder concentrically mounted with said rotating and said stationary discs, a reaction plate concentrically mounted on said stator member, a cooling fluid pump concentrically mounted between one of said brake stationary discs and said reaction plate for frictionally engaging said stationary disc and said pressure plate, said cooling fluid pump including a cover plate for engagement with said reaction plate, a pump casing engagement with one of said stationary discs, a ring gear connected to said rotatable member, a sun gear concentrically mounted within said pump casing and rotatably mounted on said stator member, a plurality of planetary gears rotatably mounted on said coverplate and said pump casing for operation with said ring gear and said sun gear, said pump casing and said cover plate frictionally engaging said stationary disc and said reaction plate to retard the rotation of said casing relative to said ring gear and thereby provide pumping action of said cooling pump upon actuation of said vehicle brakes.

6. In a vehicle disc brake comprising, in combination, a rotating member, a rotating disc connected to said rotating member, a stationary member, at least one stationary disc connected to said stationary member, a hydraulic annular wheel cylinder mounted concentrically with said rotating disc and said stator discs, said hydraulic annular wheel cylinder in communication with the means for pressurizing fluid for actuating said vehicle brakes, a reaction plate mounted concentrically with said rotating disc and said stationary disc on the opposite side of the disc stack, a fluid cooling pump including a ring gear connected to said rotating member, a sun gear rotatably mounted on said stator member, a pump casing, a plurality of planetary gears rotatably mounted in said pump casing for engaging with said ring gear and said sun gear enclosed within said pump casing, said pump casing positioned between and frictionally engaging said reaction plate and one of said stationary discs upon actuation of said vehicle brakes thereby retarding rotation of said pump casing relative to the rotation of said ring gear to provide pumping action of cooling fluid in direct proportion to the degree of actuation of said vehicle brakes.

7. In a vehicle brake comprising in combination, a rotatable member, at least one rotating disc connected to said rotatable member, a stationary member, at least one stationary disc connected to said stationary member for frictionally engaging said rotating disc, hydraulic means mounted concentric with said disc for actuating said vehicle brake, a reaction plate concentrically mounted on said stator member, a cooling fluid system including a cooling fluid pump comprising in combination a ring gear connected to said rotatable member, a sun gear rotatably mounted on said stator member, a plurality of planetary gears engaging with said ring gear and said sun gear, a pump casing enclosing a portion of said ring gear and said sun gear and rotatably supporting said plurality of planetary gears, said pump assembly thereby rotating as a unit with said rotatable member about said stationary member when said brakes are retracted, said pump casing positioned between and engaging said reaction plate and one of said stationary discs upon brake actuation to retard the rotation of said pump casing relative to said ring gear and thereby provides circulation of cooling fluid through said cooling pump in direct proportion to the engagement of said vehicle brake.

8. In a vehicle brake having a cooling fluid means comprising in combination, a rotating brake housing, at least one rotating brake disc connected to said rotating brake housing, a stationary member, at least one stationary brake disc connected to said stationary member for frictionally engaging said rotating brake disc, hydraulic means concentrically mounted with said discs for frictionally engaging said rotating brake disc with said stationary brake disc to actuate said vehicle brakes, a cooling fluid pump concentrically mounted adjacent to said brake discs, a reaction plate concentrically mounted with said brake discs on said stationary member, said cooling fluid pump having a ring gear spline connected to said brake housing for rotation with said brake housing when said housing is in rotation, a ring gear rotatably mounted on said stationary member, a plurality of planetary gears for engaging with said ring gear and said sun gear, a pump casing enclosing and rotatably supporting said planetary gears and frictionally engaging adjacent stationary brake disc and said reaction plate when said vehicle brakes are actuated to provide a circulation of cooling fluid through said cooling fluid pump, in direct response to the degree of actuation of said vehicle brakes.

9. In a vehicle brake having cooling fluid means comprising in combination, a stationary member, a plurality of stationary brake discs connected to said stationary member and having a connection to permit axial movement of said brake discs relative to said stator member when said vehicle brakes are actuated, a rotating brake housing rotatably mounted on said stationary member, at least one rotating brake disc connected to said rotating brake housing having slidable connection to permit axial movement of the rotating brake disc during actuation of said vehicle brakes, a reaction means mounted on said stationary member concentric with said discs to provide a reaction force when said vehicle brakes are actuated, hydraulic means mounted concentric with said discs for frictionally engaging said rotating brake disc with said stationary brake disc mounted concentrically on said stationary member, a cooling fluid system including a cooling fluid pump connected with said rotating member having means to permit axial movement of said cooling fluid pump relative to said rotating brake housing when said vehicle brakes are actuated, said pump comprising a sun gear rotatably mounted on said stationary member, a ring gear connected to said brake housing for rotation with said brake housing, a pump housing, a plurality of planetary gears received within and rotatably supported by said pump housing for engagement with said ring gear and said sun gear, said pump housing disposed between the adjacent stationary brake disc and said reaction means to provide frictional engagement of said pump housing and retardation of the pump housing relative to the ring gear to thereby provide pumping of cooling fluid when said vehicle brakes are actuated.

10. In a vehicle brake having a cooling fluid means comprising in combination, a stationary member, at least one stationary brake disc spline connected to said stationary member, a rotating brake housing rotatably mounted on said stationary member, at least one rotating brake disc spline connected to said rotating brake housing for frictionally engaging said stationary disc when said vehicle brakes are actuated, hydraulic means mounted concentric with said brake discs for compressing the disc stack of said rotating disc and said stationary disc when said vehicle brakes are actuated, a reaction plate mounted concentrically on said stationary member on the opposite end of said disc stack, a cooling fluid system including a cooling fluid jump disposed between said reaction plate and the adjacent stationary brake disc, said cooling fluid pump including a ring gear for rotation with said brake housing, a sun gear rotatably mounted on said stationary member, a pump housing, a plurality of planetary gears rotatably mounted in said housing for engaging with said ring gear and said sun gear received within said pump housing, said pump housing for engaging said reaction plate and said adjacent stationary brake disc when said vehicle brakes are actuated to provide retardation of said pump housing relative to the ring gear and thereby provide a pumping action of the cooling fluid pump in direct response to the degree of brake actuation when said vehicle brakes are actuated.

11. In a vehicle brake having a cooling fluid means comprising in combination, a stationary member, at least one stationary brake disc connected to said stationary member, a rotating brake housing, at least one rotating brake disc connected to said rotating brake housing for frictionally engaging said stationary brake disc, fluid means concentrically mounted with said brake discs for actuating said vehicle brake, a reaction plate concentrically mounted with said discs on said stationary member for providing the reaction force when said vehicle brakes are actuated, a cooling fluid system including a cooling fluid pump concentrically mounted on said stationary member and disposed between said reaction plate and the adjacent stationary brake disc, said fluid cooling pump including a ring gear spline connected to said brake housing, a sun gear rotatably mounted on said stationary member, a plurality of planetary gears for engaging with said ring gear and said sun gear, a pump casing receiving and rotatably supporting said plurality of planetary gears and having inlet fluid passage means feeding cooling fluid to the point of unmeshing of a planetary gear with said sun gear and the point of unmeshing of said planetary gear with said ring gear, passage means from the point of meshing of said planetary gears with said sun gear and the point of meshing of said planetary gears with said ring gear to the outlet side of said cooling fluid pump to thereby provide a pumping action employing substantially the outer periphery of said planetary gears in pumping cooling fluid in response to frictional engagement of the pump housing with said reaction plate and said adjacent stationary brake disc when said vehicle brakes are actuated.

12. In a vehicle brake having a cooling fluid means comprising in combination, a stationary member, a stationary brake disc connected to said stationary member, a rotating brake housing, a rotating brake disc connected to said rotating brake housing for frictionally engaging said stationary disc when said vehicle brakes are actuated, a reaction plate mounted on said stationary member concentric with said discs for providing a reaction force when said vehicle brakes are actuated, fluid means concentrically mounted with said discs for actuating said vehicle brake, a cooling fluid system including a cooling fluid pump comprising a ring gear connected to said brake housing, a sun gear rotatably mounted on said stationary member, a plurality of planetary gears for engaging with said ring gear and said sun gear, a pump housing enclosing and rotatably supporting said plurality of planetary gears, said pump housing forming passage means including an inlet passage leading to the point of unmeshing of said planetary gears with said sun gear and the point of unmeshing with said ring gear with said planetary gears, outlet passage means on the opposite side of said planetary gears from the inlet passage means connecting the point of meshing of said planetary gears with said sun gear and passage means for the point of unmeshing of the ring gear with said planetary gears to the opposite side of the said pump housing to provide for circulation of cooling fluid through said cooling fluid pump when said pump housing is compressively engaged between the adjacent stationary brake disc and said reaction plate when said vehicle brakes are actuated, said cooling fluid pump thereby providing circulation of cooling fluid in direct response to the degree of actuation of said vehicle brakes.

References Cited in the file of this patent
UNITED STATES PATENTS 2,399,008  Doran _____ Apr. 23, 1946
2,828,840  Kelley et al. _____ Apr. 1, 1958